United States Patent [19]

Eaves et al.

[11] 3,727,432
[45] Apr. 17, 1973

[54] TORQUE-LIMITING CLUTCHES

[75] Inventors: Dennis Robert Eaves; Horst Bergemann, both of Christchurch, England

[73] Assignee: Bishop Eaves & Sons Limited, Parkstone, Poole, England

[22] Filed: Sept. 28, 1971

[21] Appl. No.: 184,410

[30] Foreign Application Priority Data

Sept. 30, 1970 Great Britain.....................46,451/70

[52] U.S. Cl.....................................64/29, 81/52.4 R
[51] Int. Cl....................................................F16d 7/06
[58] Field of Search..........................64/29; 192/56 R, 192/150; 81/52.4 R

[56] References Cited

UNITED STATES PATENTS

| | | | |
|---|---|---|---|
| 2,238,583 | 4/1941 | Dodge | 64/29 |
| 2,881,602 | 4/1959 | Baker et al. | 64/29 |
| 2,157,574 | 5/1939 | Siesel | 64/29 |
| 2,475,518 | 7/1949 | Ristow | 64/29 |

FOREIGN PATENTS OR APPLICATIONS

| | | | |
|---|---|---|---|
| 1,057,834 | 5/1959 | Germany | 64/29 |
| 884,780 | 7/1953 | Germany | 81/52.4 R |
| 45,386 | 2/1962 | Poland | 64/29 |

Primary Examiner—Allan D. Herrmann
Attorney—Shlesinger, Fitzsimmons & Shlesinger

[57] ABSTRACT

A torque-limiting clutch includes an inner member formed with four radial passages each containing a pair of balls. The radially outermost ball of each pair normally seats in a groove in an outer member surrounding the inner member and the radially innermost ball of each pair engages a generally conical surface of the head of a spindle contained in a bore in the inner member and acted on by a spring so as to urge the balls radially outwardly. Under torque overload conditions the balls move radially inwardly to move the spindle against the action of its spring.

7 Claims, 5 Drawing Figures

TORQUE-LIMITING CLUTCHES

BACKGROUND OF THE INVENTION

1. Field of the Invention

This invention relates to torque-limiting clutches of the kind which include an outer member which has a bore which receives an inner member having a radial passage therein, roller means contained in said radial passage, an axial bore in the outer member containing a spring loaded spindle which has a head provided with a generally conical surface which engages the roller means to effect radially outward biasing thereof into engagement with a seating formation formed in the wall of the bore of the outer member for the transmission of torque between the inner and outer members, the arrangement being such that, under torque overload conditions, said roller means is displaced radially inwardly out of said seating formation and moves the spindle axially against the action of its spring loading.

2. Description of the Prior Art

German Pat. specification No. 1.057.834 shows a torque-limiting clutch of the kind referred to which has the spindle thereof arranged so that, when it is moved axially on radially inward movement of the roller means, electrical contact means is operated to terminate the drive transmitted between the inner and outer members. The clutch of German Pat. specification No. 1.057.834 is thus a single-acting torque-limiting clutch in that, as soon as torque overload conditions are sensed, the transmission of drive is interrupted.

If drive were to continue after overload conditions had been reached the outer member would rotate relative to the inner member until one complete relative rotation had been effected and then the roller means would be urged radially outwardly under the action of the spring loading acting on the spindle to re-engage the roller means in the seating formation of the outer member.

Continued re-engagement and disengagement of the roller means in its seating and repeated axial movement of the spindle under and against its spring loading will result in repeated impacts between the spindle and the roller means on the one hand and the roller means and its seating formation on the other hand resulting in rapid wear of the impacting surfaces and possible damage thereto.

For a torque-limiting clutch used in a tapping chuck it is important that repeated engagement and disengagement of the roller means from its seating formation should be effected without there being considerable wear or damage of the relatively moving parts of the clutch.

It is accordingly an object of the present invention to provide a torque-limiting clutch of the kind referred to the design of which is such as to permit repetitive engagement and disengagement of the roller means from the seating formation of the outer member.

SUMMARY OF THE INVENTION

The generally conical surface of the head of the spindle includes a first portion having a first apical angle and a second portion having a second apical angle greater than said first apical angle, the roller means engaging said first portion during transmission of torque between the inner and outer members and the spindle moving relative to the inner member into a position in which the roller means engages said second portion when the roller means moves radially inwardly to disengage from the seat formation of the outer member under torque overload conditions.

DESCRIPTION OF A PREFERRED EMBODIMENT

Figure 2:
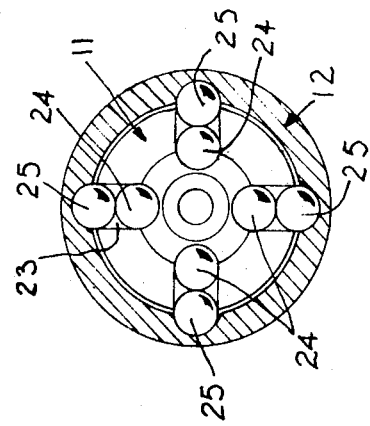
FIG. 2 is a transverse sectional view of the clutch.
Figure 1:
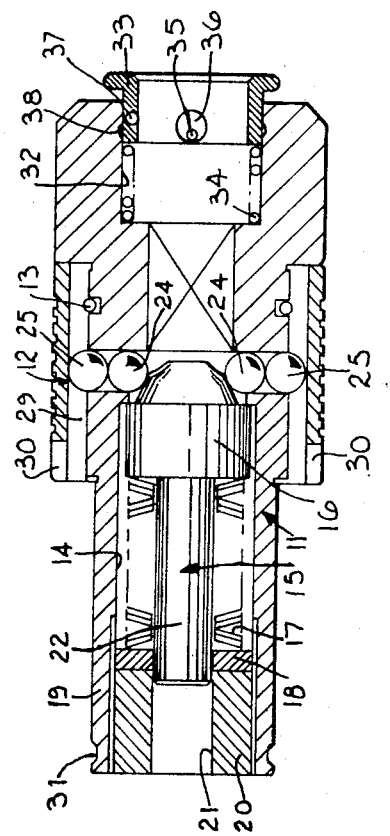
FIG. 1 is a longitudinal sectional view of a torque-limiting clutch for use in a tapping chuck and including an inner member, an outer member, balls for the transmission of torque between the inner and outer members and an axially movable spring-loaded spindle for biasing the balls radially outwardly, the parts of the clutch being shown in the relative positions which they occupy during the transmission of torque between the inner and outer members.

The particular form of torque-transmitting clutch shown in the drawings takes the form of a tool adaptor for a tapping chuck and the tool adaptor includes an inner member 11 and an outer member 12 which is fixed axially relative to the inner member 11 by means of a circlet 13 which is received in aligned circumferential grooves formed in the inner surface of the outer member 12 and the outer surface of the inner member 11. The inner member 11 has an axial bore 14 therein in which a spindle 15 is received and the spindle 15 includes a head portion 16 and a series of Belleville washers 17 act between the head portion 16 and a washer 18 to urge the spindle 15 in a direction away from end portion 19 of the inner member 11. The washer 18 is held in position by means of an externally threaded member 20 which engage with a threaded end portion of the bore 14 and which is provided with a through bore 21 which receives a portion of the stem 22 of the spindle 15.

As shown clearly in FIG. 2 the inner member 11 is formed with four equi-angularly spaced passages 23 which extend between the bore 14 of the inner member and the outer surface thereof and each of these passages accommodates a radially inner ball 24 and a radially outer ball 25.

Figure 5:
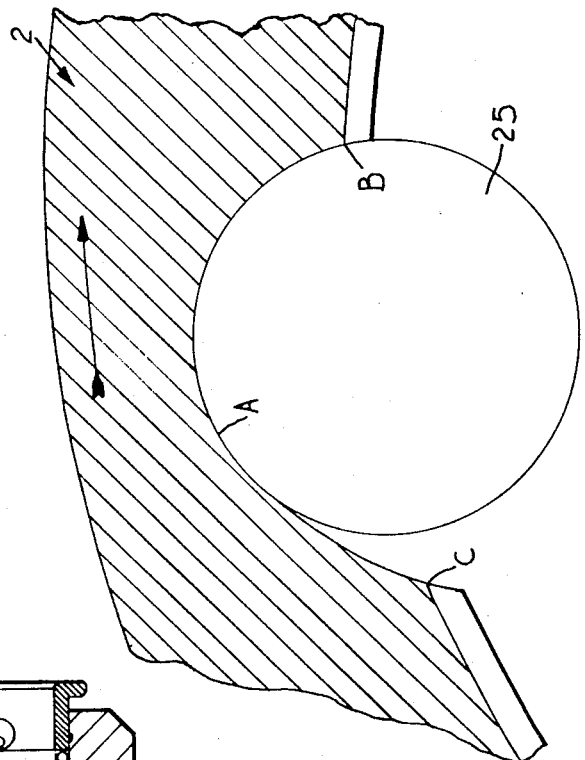
FIG. 4 is a side view of the spindle contained within the inner member and FIG. 5 is a detail sectional view showing the cross-sectional configuration of a groove formed in the outer member of the clutch.
Figure 3:
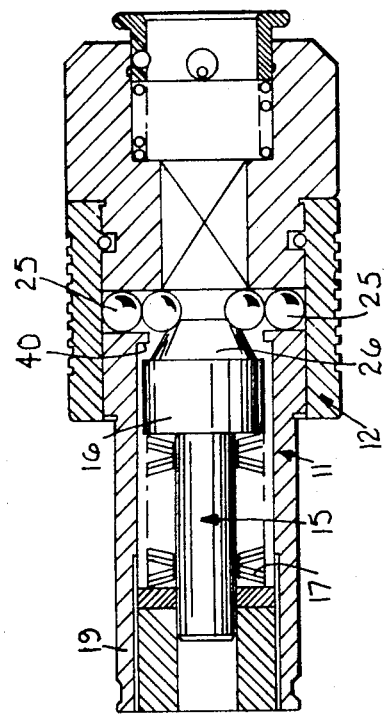
FIG. 3 is a longitudinal sectional view of the clutch corresponding to FIG. 1 but showing the various parts thereof in the relative positions which they occupy when torque overload conditions arise.
Figure 4:
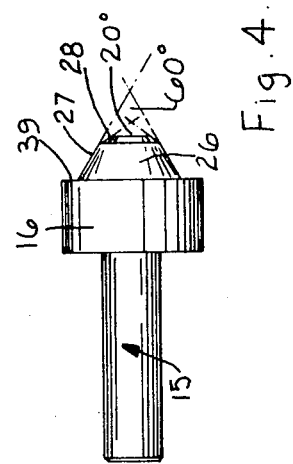

As can be seen most clearly from FIG. 4 the head portion 16 of the spindle 15 includes a generally cylindrical portion formed integral with a generally frusto-conical portion 26 and the generally frusto-conical portion 26 includes a first portion 27 having an apex angle of 60° and a second portion 28 having an apex angle of 120°. The balls 24 and 25 are arranged in the passages 23 so that the innermost ball 24 of each pair engages the generally frusto-conical head portion 26 and so that the radially outermost ball 25 of each pair normally projects radially outwardly of its passage 23. The outer member 12 is formed with four equi-angularly spaced axially extending grooves 29 in its inner surface and the cross-section of each groove 29 is illustrated in FIG. 5. In cross-section each groove 29 includes a first portion which extends between the positions indicated at A and B in FIG. 5 and this first portion has a radius of curvature substantially equal to the radius of a ball 25 so that in the normal position of the balls 24 and 25 the radially outermost ball 25 of each pair engages in a groove 29 with its center on the center of curvature of the first portion of the cross-section of the groove 29. The second portion of the cross-section of the groove 29 extends between the positions indicated at A and C in FIG. 5 and this second portion of the groove 29 is of progressively increasing radius of curvature.

The biasing force exerted by the Belleville washers 17 on the spindle 15 can be adjusted by adjusting the position of the threaded member 20 within the bore 14 of the inner member. As the inner balls 24 engage the generally frusto-conical portion 26 of the head 16 of the spindle 15, the biasing force exerted by the Belleville washers 17 is transmitted to the balls 24 and 25 so that the balls are urged radially outwardly and the balls 25 thus serve to transmit torque between the inner member 11 and the outer member 12 while they are seated in their respective grooves 29 in the outer member 12.

As applied to a tool adaptor for a tapping chuck the outer member 12 is arranged to transmit drive to the inner member 11 and the outer member 12 is formed with a pair of diametrically opposed recesses 30 each of which is of rectangular form in plan view to receive drive lugs of a drive element (not shown) of the tapping chuck, said drive element including a bore in which the inner member 11 is received, the wall of the bore in the drive element carrying one or more inwardly projecting balls arranged to seat in a circumferential groove 31 formed in the inner member 11 whereby the inner member 11 is held against axial movement relative to the drive element of the chuck.

The other end of the inner member 11 is provided with a socket 32 in which a sleeve 33 is received, the sleeve 33 being urged outwardly of the socket 32 by a spring 34, outward movement of the sleeve 33 being limited by engagement of a pin 35 with the surrounds of an aperture 36 formed in the wall of the sleeve 33. The sleeve 33 is provided with three equi-angularly spaced openings in which balls 37 are received, each ball 37 having a diameter greater than the wall thickness of the sleeve 33. The balls 37 are arranged to seat in a circumferential groove in a tap (not shown) to hold the tap within the sleeve and, to disengage the tap from the sleeve 33, the sleeve 33 is moved inwardly into the socket 32 against the action of the spring 34 to bring the balls 37 into register with a circumferential groove 38 formed in the wall of the socket 32 whereby the balls 37 are free to move radially outwardly to release the grip on the tap.

During a tapping operation the outer member 12 of the clutch rotates in the direction indicated by the arrow in FIG. 5 and when the torque transmitted between the inner and outer members increases, the balls 25 in the grooves 29 will tend to roll along the second portion AC of the cross-sections of the grooves 29 and thus each ball 25 will tend to move radially inwards. When the torque transmitted between the inner and outer members exceeds a certain value, the biasing force exerted on the spindle 15 by the Belleville washers 17 will be insufficient to prevent the balls 25 from starting to roll out of their respective grooves 29. The particular shaping of the second portion AC of the cross-section of each groove 29 is such that, when the balls 25 start to roll within the grooves 29, the radially inwardly directed force transmitted to each ball 25 will increase as the distance by which each ball has rolled increases. The condition is thus such that, when overload conditions arise and the balls 25 start to roll within their grooves 29 such rolling of the balls within the grooves will continue without it being necessary for there to be a substantial increase in the torque transmitted between the inner and outer members of the clutch.

When the balls 25 reach positions in which they are clear of the grooves 29, the innermost ball 24 of each pair will have moved from a position in which it engaged the first portion 27 of the generally frusto-conical portion 26 of the head 16 of the spindle to a position in which said ball 24 engages the second portion 28 of said surface. The axial force transmitted to the spindle 15 to move it against the action of the Belleville washers 17 depends on the inclination of the surface engaged by the innermost balls 24.

When, therefore, torque overload conditions are obtained as a result of, for example, the tap reaching the bottom of a blind bore, the balls 24 will initially move over the surface portion 27 and then, when the balls 25 disengage from the grooves 29, the balls 24 will move into engagement with the surface portion 28. The rate of movement of the spindle 15 is dependent on the axial force exerted thereon by the balls 24 and thus the acceleration to which the spindle 15 is subject on torque overload conditions being obtained is decreased when the innermost balls 24 move from a position in engagement with the first surface portion 27 into engagement with the second surface portion 28. The degree of compression of the Belleville washers 17 is thus less than would be the case if the frusto-conical portion 26 of the head 16 were of uniform apical angle. After the outermost balls 25 have disengaged from the grooves 29, continued rotation of the outer member relative to the inner member 11 will result in the outer member 12 moving into a position spaced 90° from its original position in which the balls 25 are again in register with grooves 29 in the outer member 12. When such 90° of relative rotation has taken place the Belleville washers 17 will urge the spindle 15 back towards its original position. In order to avoid the transmission of impacts between the head of the spindle and the balls 24, the generally cylindrical portion of the head 16 is shaped so as to provide a shoulder 39 which abuts a shoulder 40 provided by an inturned lip in the bore 14 of the inner member 11.

The relative positions of the shoulders 39 and 40 and the dimensions of the various parts of the clutch are such that, when the spindle, under the action of its spring loading, moves back towards its original position to urge the balls 24 and 25 radially outwardly, the shoulder 39 abuts the shoulder 40 prior to the radially outermost ball 25 of each pair engaging the base of the associated groove 29. When, therefore, the spindle 15 is spring urged back to its original position, the transmission of impacts between the radially innermost balls 24 and the generally frusto-conical surface 26 are minimized as are impacts between the radially outermost balls 25 of each pair and the bases of the grooves 29.

When, therefore, torque overload conditions arise and the balls 24 and 25 are subject to repeated radially inward and radially outward movement and the spindle 15 is subject to repeated movement against and under the action of its spring loading, the conditions are such as to minimize wear of the balls 24 and 25 and the parts which they engage.

After the required tapping operations have been effected and it is required to remove a driven tap from a bore in a workpiece, the drive element in association with the outer member 12 of the clutch is driven in the reverse direction, i.e., in the direction opposite to the arrow in FIG. 5. When the outer member 12 moves in the direction opposite to the arrow of FIG. 5, the radially outermost balls 25 of each pair are engaged by those surface portions of the grooves 29 between the points A and B of FIG. 5. As this part of the surface of each groove 29 has a radius of curvature substantially equal to the radius of curvature of the balls 25, the radially inward component of the force transmitted between the outer member 12 and each ball 25 is substantially less than the radially inward component of the force transmitted between the outer member 12 and the balls 25 when the outer member 12 is rotating in the direction indicated by the arrow in FIG. 5. As a result of this the torque which can be transmitted between the inner and outer members when removing a tap from the workpiece is substantially greater than the torque which can be transmitted between the inner and outer members during a tapping operation.

The various parts of the clutch can thus be set up so that slipping between the inner and outer members of the clutch will take place during a tapping operation as a result of quite small overload conditions without there being the possibility of clutch slipping during reverse rotation of the tap.

As discussed above the axial component of force transmitted by the balls 24 and 25 to the spindle 15 to move it against the action of its spring loading when the balls 24 and 25 move radially inwardly under torque overload conditions depends on the inclination of the surface of the head engaged by the balls 25.

By arranging therefore for the ball 25 to engage the second portion 28 of the generally conical surface of the head of the spindle when the balls move radially inwardly so that the balls 25 are out of engagement with the grooves 29 of the outer member 12, the axial component of force acting on the spindle 15 to move it against its spring loading is substantially reduced as compared with the force which would act on the spindle if the inclination of the whole of the engaged surface of the head of the spindle corresponded to that of the first portion 27. The distance by which the spindle 15 is displaced is thus also reduced and this in turn reduces the spring force acting to bias the spindle 15 back towards its original position.

When, therefore, torque overload conditions occur and the outer member 12 rotates relative to the inner member 11 until the balls 25 are again in register with the grooves 29 so that the balls 24 and 25 tend to move radially outwardly whereby the balls 25 enter the grooves 29, the force acting to urge each ball 25 radially outwardly will be correspondingly reduced thus reducing the impact between each ball 25 and the associated groove 29.

The stop 40 provided in the bore 14 of the inner member 11 is arranged to engage the shoulder 39 on the spindle when the balls move radially outwardly, such engagement of the shoulder 39 with the stop 40 being arranged to take place prior to the balls 24 and 25 having completed their radially outward movements so as to avoid the transmission of impacts between the balls 24 and the spindle 15.

In order to obtain the maximum possible strength for the inner member of the clutch it is desired to reduce, so far as possible, the circumferential extent of the radial passages 23 formed in the inner member 11 and hence it is desired that the roller means in said passages 23 should have the smallest possible diameter. Rather, therefore, than have a single ball in each of said passages, a pair of balls 24 and 25 are contained in each of said passages, the radially outermost ball being arranged to engage with a corresponding groove 29 of the outer member and the radially innermost ball 25 being arranged to engage the generally conical surface 26 of the head of the spindle.

In the arrangement shown in the drawing the base of the socket 32 which receives the body of the tap is formed with a rectangular cross-section bore to receive a rectangular cross-section extension of the tap body to obtain a positive drive connection between the inner member 11 and the tap body.

We claim:

1. In a torque-limiting clutch which includes an outer member having a bore which receives an inner member having a radial passage therein, roller means contained in said radial passage, an axial bore in the outer member containing a spring-loaded spindle which has a head provided with a generally conical surface which engages the roller means to effect radially outward biasing thereof into engagement with the seating formation formed in the wall of the bore of the outer member for the transmission of torque between the inner and outer members, the arrangement being such that, under torque overload conditions, said roller means is displaced radially inwardly out of said seating formation and moves the spindle axially against the action of its spring loading, the improvement wherein the generally conical surface of the head of the spindle includes a first portion having a first apical angle and a second portion having a second apical angle greater than said first apical angle, the roller means engaging said first portion during transmission of torque between the inner and outer members and the spindle moving relative to the inner member into a position in which the roller means engages said second portion when the roller means moves radially inwardly to disengage from the seating formation of the outer member under torque overload conditions and said spindle has a shoulder arranged to engage the stop provided in the bore in the inner member to limit the extent of movement of the spindle under the action of its spring loading such engagement of the shoulder and the stop being arranged to take place prior to the roller means having completed its radially outward movement so as to avoid the transmission of impacts between the roller means and the spindle.

2. A torque-limiting clutch according to claim 1 wherein the inner member is provided with a plurality of equi-angularly spaced radially extending passages each of which contains a pair of roller elements, the radially outer roller element of each pair being arranged to engage a seating formation of the outer member and the radially inner roller element of each pair being arranged to engage the generally conical surface of the head of the spindle.

3. A torque-limiting clutch according to claim 1 wherein the spring means acting on the spindle comprises a plurality of Belleville washers surrounding a stem of the spindle and wherein the stem of the spindle passes through an annular member contained within the bore in the inner member and wherein means are provided for adjusting the axial spacing between said annular member and the head of the spindle to vary the spring loading acting on the spindle.

4. A torque-limiting clutch according to claim 1 wherein the seating formation in the outer member is constituted by a groove of asymmetrical cross-section.

5. A torque-limiting clutch according to claim 4 wherein the groove comprises, in cross-section, a first portion having a radius of curvature substantially equal to that of the associated roller means and a center of curvature lying on a line interconnecting the base of the groove and the axis of the outer member and a second portion which has a radius of curvature which increases progressively from the base of the groove to the side thereof, the shaping of said second portion of the groove serving to facilitate rolling of the associated roller element out of the groove under torque overload conditions.

6. In a torque-limiting clutch which includes an outer member which has a bore which receives an inner member having a radial passage therein, roller means contained in said radial passage, an axial bore in the inner member containing a spring loaded spindle which has a head provided with a generally conical surface which engages roller means to effect radially outward biassing thereof into engagement with the seating formation formed in the wall of the bore of the outer member for the transmission of torque between the inner and outer members, the arrangement being such that, under torque overload conditions, said roller means is displaced radially inwardly out of said seating formation and moves the spindle axially against the action of its spring loading, the improvement wherein the inner member is formed with a plurality of equi-angular spaced radial passages each of which contains a pair of balls, the radially innermost ball of each pair being arranged to engage generally conical surface of the head of the spindle and the outer member of the clutch being formed with a corresponding plurality of seating formations each arranged to receive the radially outermost ball of the associated pair and said spindle has a shoulder arranged to engage a stop provided in the bore of the inner member to limit the extent of movement of the spindle under the action of its spring loading and wherein means are provided for adjusting said spring loading.

7. A torque-limiting clutch according to claim 6 wherein each seating formation in the outer member is constituted by a groove of asymmetrical cross-section comprising a first portion having a radius of curvature substantially equal to that of a ball and a center of curvature lying on a line interconnecting the base of the groove and the axis of the outer member and a second portion which has a radius of curvature which increases progressively from the base of the groove to the side thereof.

* * * * *